(12) United States Patent
Kang

(10) Patent No.: US 10,684,189 B2
(45) Date of Patent: Jun. 16, 2020

(54) AIR TIGHT PACKAGING CONTAINER FOR EASY LEAKAGE TEST AND LEAKAGE TEST METHOD AND APPARATUS USING SAME

(71) Applicant: Sungil Kang, Seongnam-si (KR)

(72) Inventor: Sungil Kang, Seongnam-si (KR)

( * ) Notice: Subject to any disclaimer, the term of this patent is extended or adjusted under 35 U.S.C. 154(b) by 241 days.

(21) Appl. No.: 14/908,964

(22) PCT Filed: Aug. 6, 2014

(86) PCT No.: PCT/KR2014/007266
§ 371 (c)(1),
(2) Date: Jan. 29, 2016

(87) PCT Pub. No.: WO2015/020424
PCT Pub. Date: Feb. 12, 2015

(65) Prior Publication Data
US 2016/0161359 A1    Jun. 9, 2016

(30) Foreign Application Priority Data

Aug. 7, 2013 (KR) .................... 10-2013-0093645

(51) Int. Cl.
*G01M 3/32* (2006.01)
*A45D 34/00* (2006.01)
(Continued)

(52) U.S. Cl.
CPC ............ *G01M 3/32* (2013.01); *A45D 33/24* (2013.01); *A45D 34/00* (2013.01); *A45D 40/00* (2013.01);
(Continued)

(58) Field of Classification Search
CPC .......... G01M 3/00; G01M 3/02; G01M 3/06; G01M 3/10; G01M 3/26; G01M 3/32;
(Continued)

(56) References Cited

U.S. PATENT DOCUMENTS 4,398,413 A * 8/1983 Rao ..................... G01M 3/226
429/90
5,307,685 A * 5/1994 Bloome ............. G01M 3/3272
73/45.4

(Continued)

FOREIGN PATENT DOCUMENTS

| JP | 3467010 B2 | 11/2003 |
|---|---|---|
| KR | 20-0311423 Y1 | 4/2003 |
| KR | 20-0354451 Y1 | 6/2004 |
| KR | 10-2012-0045146 A | 5/2012 |

*Primary Examiner* — Alexander A Mercado
(74) *Attorney, Agent, or Firm* — Heedong Chae Lucem, PC

(57) ABSTRACT

The present invention relates to an airtight packaging container, which is easy to carry out a leakage test, includes a cosmetic container (30) for holding a cosmetic (c) containing a high content of moisture and volatile matter (e.g., alcohol, etc.), such as foundation or cosmetic cream; and an airtight lid (60) which is provided on the cosmetic container (30) in order to prevent the moisture and volatile matter of the cosmetic (c) from evaporating and being volatilized, the airtight lid (60) comprising a sealing plate (62) for covering the cosmetic container (30) and a sealing protrusion wheel (64) formed on the underside of the sealing plate and inserted into an opening part of the cosmetic container (30) while being tightly pressed against the opening part, wherein a leakage test member (70) is formed in the sealing plate (62) of the airtight lid (60).

6 Claims, 14 Drawing Sheets

(51) Int. Cl.
*A45D 40/00* (2006.01)
*A45D 33/24* (2006.01)
*A45D 40/22* (2006.01)
*B65D 51/24* (2006.01)

(52) U.S. Cl.
CPC ............ *A45D 40/22* (2013.01); *B65D 51/24* (2013.01); *G01M 3/3272* (2013.01); *A45D 2200/051* (2013.01)

(58) Field of Classification Search
CPC ............ G01M 3/3209; G01M 3/3236; G01M 3/3263; G01M 3/3272; A45D 33/24; A45D 33/26
USPC .......................................................... 429/185
See application file for complete search history.

(56) References Cited

U.S. PATENT DOCUMENTS

| | | | | |
|---|---|---|---|---|
| 5,327,784 | A * | 7/1994 | Venkatesan | G01M 3/3272 73/714 |
| 6,536,447 | B1 | 3/2003 | Fioravanti | |
| 7,921,625 | B1 * | 4/2011 | Mayer | B01L 3/523 53/434 |
| 2003/0170149 | A1 * | 9/2003 | Jennings | B01J 19/126 422/129 |
| 2003/0172949 | A1 * | 9/2003 | Alexander | A45D 33/006 132/303 |
| 2014/0345365 | A1 * | 11/2014 | Aono | G01N 1/2226 73/38 |
| 2015/0236336 | A1 * | 8/2015 | Hirakawa | H01M 2/365 429/185 |

* cited by examiner

AIR TIGHT PACKAGING CONTAINER FOR EASY LEAKAGE TEST AND LEAKAGE TEST METHOD AND APPARATUS USING SAME

TECHNICAL FIELD

The present invention relates to an airtight packaging container which is easy to carry out a leakage test, and a leakage test method and a leakage test apparatus using the same. More particularly, the present invention relates to an airtight packaging container which is capable of easily performing a leakage test to determine whether the airtight packaging container is perfectly sealed, where the airtight packaging container, which includes a cosmetic container and an airtight lid provided on the cosmetic container, is used to prevent cosmetics, such as foundation or cosmetic cream, containing a large quantity of volatile ingredients such as water or alcohol, from being evaporated or volatilized. In addition, the present involution relates to a method and an apparatus for taking a leakage test of whether the sealing is perfectly maintained by using the airtight packaging container.

BACKGROUND ART

In general, since cosmetics contain a large quantity of water or volatile ingredients, if a cosmetic container is not perfectly air-tightened, the water and volatile ingredients are evaporated and volatilized, so that the quantity of cosmetics is reduced. In addition, when the water and volatile ingredients are evaporated and volatilized, the mixing ratio between cosmetic ingredients is varied so that the performance of the cosmetics is deteriorated.

In addition, when the water and volatile ingredients of cosmetics are evaporated and volatilized, since the cosmetics are dried so that the original function of cosmetics is lost, it is very important to keep the cosmetics to maintain the original ingredients of the cosmetics.

To solve the above-described problems, a cosmetic container according to the related art employs an airtight packaging container in which a sealing cap for maintaining air tightness is installed to prevent water and volatile ingredients from being evaporated and volatilized.

As shown in FIG. 1, a cosmetic container 200 having a sealing cap according to the related art includes an elastic packing 220 installed in a space between inner and outer walls 201 and 202 of the cosmetic container 200 conventionally containing cosmetics 221, and a sealing protrusion 241 formed on the sealing cap 240 configured to be opened and closed about a hinge 250. Thus, the sealing protrusions 241 of the sealing cap 240 presses the packing 220 of the cosmetic container 200, so that the cosmetic container is sealed.

However, according to the cosmetic container of the related art, the sealing protrusion 241 is only pressed on the packing 220 so that one side of the sealing protrusion 241 is lifted up by the packing 220. Thus, since the sealing cap 240 is not horizontally maintained, a gap is frequently generated between the packing 220 and the sealing protrusion 241 so that the contents are dried. Accordingly, to solve the problems of the cosmetic container according to the related, as shown in FIG. 2, the applicant of the present application had proposed a sealing-enhanced cosmetic container 100 disclosed in Korean Registered Utility Model No. 20-0306854. The sealing-enhanced cosmetic container 100 proposed includes an elastic jacking 125 installed in a space between inner and outer walls 123 and 124 of the cosmetic container 100 containing cosmetics 121, and a sealing protrusion 128 formed on a sealing cap 126 configured to be opened and closed about a hinge 127, such that the sealing protrusion 128 of the sealing cap 126 presses the packing 125 of the cosmetic container 100. In addition, a pressing rod 116 is further formed in an outer cap 124 configured to be opened or closed about a hinge 115, such the pressing rod 116 of the outer cap 114 presses the closed sealing cap 126 once more again, thereby enhancing the sealing.

However, according to the cosmetic container 100 of the related art, the sealing cap is maintained in a flat shape all the times to allow the sealing protrusion to uniformly press the packing of the cosmetic container, so that the sealing may be maintained. Since the packing is generally formed of rubber, the packing is hardened over time, so that the sealing is deteriorated.

To solve the problems, as shown in FIG. 3, there has been proposed a cosmetic container in which a sealing protrusion wheel 322 formed on a cap 320 is tightly press-inserted into an inlet of the cosmetic container 300. However, since the sealing protrusion wheel 322 is tightly inserted into the inlet of the cosmetic container 300, when the cap 320 is closed, the air in the cosmetic container 300 is compressed so that the closed cap 320 is lifted up again, so the sealing is released.

In addition, to solve the problems of the related art, as shown in FIG. 4, the applicant of the present application had proposed a cosmetic container having an air entrance/exit member disclosed in Korean Utility Model Application No. 20-2013-6315. The cosmetic container having an air entrance/exit member includes a cosmetic container 400 and a sealing cap 420 opened or closed on the cosmetic container 400. The sealing cap 420 includes a sealing plate 422 covering the cosmetic container 400, a sealing protrusion wheel 424 formed on a lower surface of the sealing plate 422, and the air entrance/exit member 440 installed on the sealing plate 422. When the cosmetic container 400 is closed with the sealing cap 420, the sealing protrusion wheel 424 of the sealing cap 420 is tightly inserted into the cosmetic container 400 so that air is compressed. In this case, after the gap 442 between the air entrance/exit member 440 and the sealing plate 422 is opened to discharge the compressed air by pushing an upper portion of the air entrance/exit member 440, the pressure on the air entrance/exit member 440 is removed to allow the gap 442 between the air entrance/exit member 440 and the sealing plate 422 to be closed, so that the sealing is completed.

However, although various airtight packaging containers have been proposed, since the airtight packaging containers have been progressed while being focused only on the sealing enhancement, any products capable of easily taking a leakage test whether the airtight packaging container is perfectly sealed have not been proposed. In addition, a method and an apparatus for testing leakage of an airtight packaging container have not been properly proposed.

Meanwhile, there has been disclosed a method of testing leakage of a sealed container in Korean Unexamined Patent Publication No. 10-1998-701796. The method tests the leakage of a sealing cap 540 of a sealed container 500 which contains electrolyte product compound 520 and on which the sealing cap 540 is mounted. According to the method, after a first electrode 510 is inserted into the sealed container 500 containing the electrolyte product compound 520, the sealed container 500 is dipped into electrolyte bath solution 530 and a second electrode 550 makes contact with the electrolyte bath solution 530. Then, the first and second electrodes 510 and 550 are connected to a DC current source 560 to measure the conductivity from the first electrode 510 to the second electrode 550. If any current does not flow from the first electrode 510 to the second electrode 550, the sealed container 500 is not leaked. To the contrary, if any current flows from the first electrode 510 to the second electrode 550, the sealed container 500 is leaked. In addition an apparatus for testing sealing leakage in such a manner has been proposed.

However, according to the method and apparatus for testing sealing leakage by using the electrolyte product compound 520 and the DC current source 560, since a hole 570 must be formed at a part of the sealed container 500 and the first electrode 510 must be inserted into the sealed container 500 through the hole 570 for test, it is impossible to take a test of sealing leakage without destroying the sealed container 500. In addition, when the sealed container 500 contains cosmetics containing a large quantity of water and volatile ingredients and the air pressure is increased due to the water evaporation and the volatilization of the volatile ingredients, it is impossible to test the leakage between the sealed case 500 and the sealing cap 540 through the method of testing only the leakage between the sealed case 500 and the sealing cap 540.

DISCLOSURE

Technical Problem

To solve the problems described above, an object of the present invention is to provide an airtight packaging container which is capable of easily taking a leakage test whether the airtight packaging container is perfectly sealed by forming a leakage test member on an airtight lid, where the airtight packaging container includes an airtight lid mounted on a cosmetic container in order to prevent water and volatile ingredients contained in cosmetics such as foundation or cosmetic cream from being evaporated and volatilized.

In addition, another object of the present invention is to provide a method and an apparatus for taking a leakage test of whether an airtight packaging container capable of easily taking the leakage test is perfectly sealed, particularly, without modifying or destroying the airtight packaging container.

Still another object of the present invention is to provide a method and an apparatus for taking a leakage test of whether the sealing is perfected between an air entrance/exit member and an airtight lid, where the air entrance/exit member and a leakage test member are formed on the airtight lid installed on an airtight packaging container.

Still another object of the present invention is to provide a cosmetic container having sealing ability preferable to prevent water and volatile ingredients contained in cosmetics from being evaporated and volatilized, where the cosmetics are contained in the cosmetic container in an airtight packaging container.

Still another object of the present invention is to provide a method and an apparatus for testing leakage of an airtight packaging container, especially, a cosmetic container containing cosmetics, to recognize the degree of leakage of air pressure desirable for the cosmetic container.

Technical Solution

To achieve the objects, the present invention provides an airtight packaging container which includes:

a cosmetic container (30); and an airtight lid (60) installed onto the cosmetic container (60) in order to prevent cosmetics (c), such as foundation or cosmetic cream, containing a large quantity of volatile ingredients such as water or alcohol, from being evaporated or volatilized, wherein the airtight lid (60) includes a sealing plate (62) for covering the cosmetic container (30); and a sealing protrusion wheel (64) formed on a lower surface of the sealing plate (62) and tightly press-inserted into an inlet of the cosmetic container (30), and wherein a leakage test member (70) formed on the sealing plate (62) of the airtight lid (60).

The leakage test member (70) is f erred of one of elastomer, silicon rubber and NBR rubber having superior restoration.

The leakage test member (70) has a cylindrical shape and is provided at a center thereof with a coupling groove (72). A sealing plate (62) of the airtight lid (60) is provided with a coupling hole (82) into which the leakage test member (70) is coupled. A coupling protrusion wheel (84) is formed at a center of the coupling hole (82). The coupling protrusion wheel (84) of the sealing plate (62) is coupled into the coupling groove (72) of the leakage test mender (70), so that the leakage test member (70) is coupled to the sealing plate (62).

The leakage test member (70) has a thickness in a range of 1.5 mm to 5.0 mm.

The leakage test member (70) has a diameter in a range of 3.0 m~8.0 mm.

The airtight lid (60) may be hinge coupled to the cosmetic container (30), and a handle (68) may be diagonally formed on the hinged part of the airtight lid (60). A coupling protrusion (63) is formed below the handle (68) such that the coupling protrusion (63) is coupled into a coupling groove (36) formed in the cosmetic container (30). An air entrance/exit member (66) is formed on the sealing plate (62) of the airtight lid (60) together with the leakage test member (70).

After the cosmetic container (30) is closed with the airtight lid (60) by coupling the coupling groove (63) of the airtight lid (60) into the coupling groove (36) of the cosmetic container (30), when force in a range of 3 kgf to 5 kgf is applied to the airtight lid (60), the airtight lid (60) is opened from the cosmetic container (30).

A coupling hole (621), into which the air entrance/exit member (66) is coupled, is formed in the sealing plate (62), and a plurality of ribs (622) is formed near the coupling hole (621) so that slits (623) through which air flows are formed between the ribs (622). The air entrance/exit member (66) includes a cover plate (663) for covering an upper portion of the coupling bole (621) of the airtight lid (60), a coupling rod (664) formed below the cover plate (663) and inserted into the coupling hole (621) of the airtight lid (60), a packing-separation preventing protrusion wheel (665) extending from an end of the coupling rod (664) to prevent the packing (67) from being separated therefrom, a packing (67) fitted with the coupling rod (664) of the air entrance/exit member (66) and provided at a center thereof with a rod coupling hole (671) coupled to the coupling rod (664) of the air entrance/exit member (66), an expansion part (672) formed on a lower portion of the packing (67) to open or close the coupling hole (621) of the airtight lid (60); and a resilient part (673) formed on an upper portion of the packing (67) to elastically and upwardly support the cover plate (663) of the air entrance/exit member (66) to allow the expansion part (672) to close the coupling hole (621) of the airtight lid (60).

According to the present invention, there is provided a leakage test apparatus for taking a leakage test of whether an airtight packaging container is perfectly sealed. The leakage test apparatus includes: a product seat member (92) for seating the airtight packaging container (AC) on which a leakage test member (70) is formed; an air injection member (94) for injecting air through the leakage test member (70), the air injection member (94) having a syringe needle (93) mounted thereon; and an air compressor (96) for sucking air through an air suction inlet (95) and injecting the air into a cosmetic container (30) through the syringe needle (93) of the air injection member (94).

According to the present invention, there is provided a method of performing a leakage test to determine whether the airtight packaging container is perfectly sealed. The method includes the steps of: (S10) seating an airtight packaging container (AC), on which a leakage test member (70) subject to the leakage test is formed, at a product seat member (92); (S20) transferring an air injection member (94), on which a syringe needle (93) is mounted, to allow the syringe needle (93) to pass through a leakage test member (70) of a cosmetic container (30), so that an outlet (932) of the syringe needle (93) is placed in an airtight packaging container (AC); (S30) sucking air through an air suction inlet (95) by operating an air compressor (96) to inject the air into the cosmetic container (30) through the syringe needle (93) mounted on an air injection member (94); (S40) stopping an operation of the air compressor (96) after the air is injected until the internal pressure of the cosmetic container (30) reaches a predetermined pressure; (S50) separating the air injection member (94) on which the syringe needle (93) is mounted from the cosmetic container (30); (S60) leaving the airtight packaging container (AC) for 5 hours to 48 hours; and (S70) after the predetermined time is elapsed, measuring the internal pressure of the cosmetic container (30) to compare the measured internal pressure with an internal pressure under air injection.

Advantageous Effects

According to the present invention, there is provided an airtight packaging container which is capable of easily taking a leakage test whether the airtight packaging container is perfectly sealed by forming a leakage test member on an airtight lid, where the airtight packaging container includes an airtight lid mounted on a cosmetic container in order to prevent water and volatile ingredients contained in cosmetics such as foundation or cosmetic cream from being evaporated and volatilized.

In addition, according to the present invention, there is provided a method and an apparatus for taking a leakage test of whether an airtight packaging container capable of easily taking the leakage test is perfectly sealed. Particularly, the leakage test may be performed without modifying or destroying the airtight packaging container.

In addition, according to the present invention, there is provided a method and an apparatus for taking a leakage test of whether the sealing is perfected between an air entrance/exit member and an airtight lid, where the air entrance/exit member and a leakage test member are formed on the airtight lid installed on an airtight packaging container.

In addition, according to the present invention, there is provided a cosmetic container having sealing ability preferable to prevent water and volatile ingredients contained in cosmetics from being evaporated and volatilized, where the cosmetics are contained in the cosmetic container in an airtight packaging container.

In addition, according to the present invention, there is provided a method and an apparatus for testing leakage of an airtight packaging container, especially, a cosmetic container containing cosmetics, to recognize the degree of leakage of air pressure desirable for the cosmetic container.

BEST MODE

Mode for Invention

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
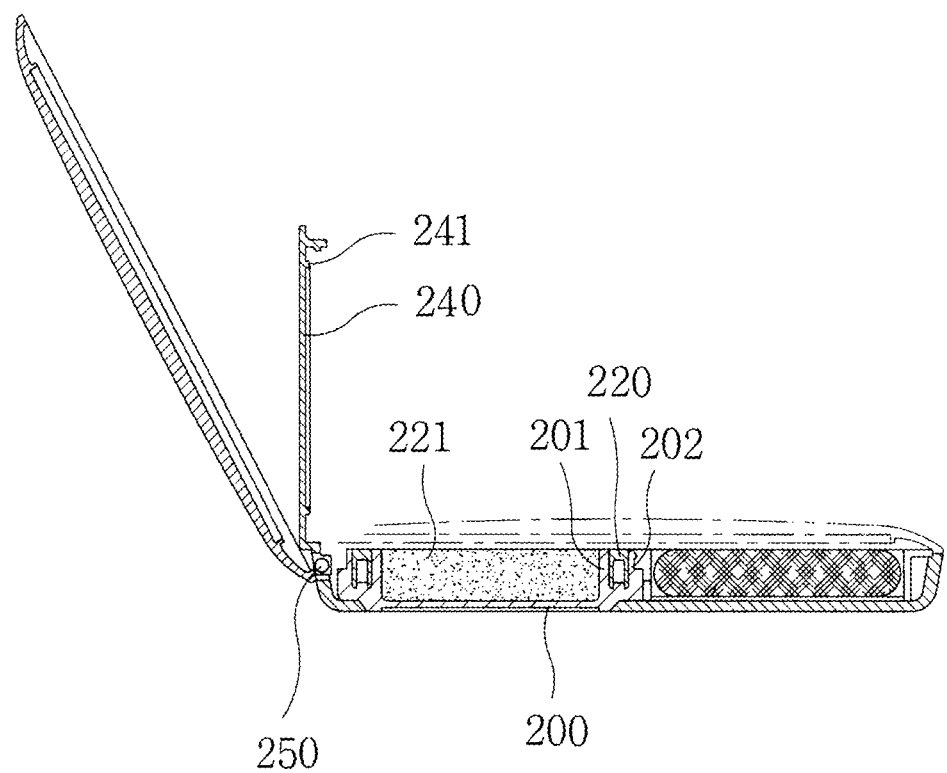
FIG. 1 is a sectional view showing a cosmetic container having an airtight lid according to the related art.
Figure 2:
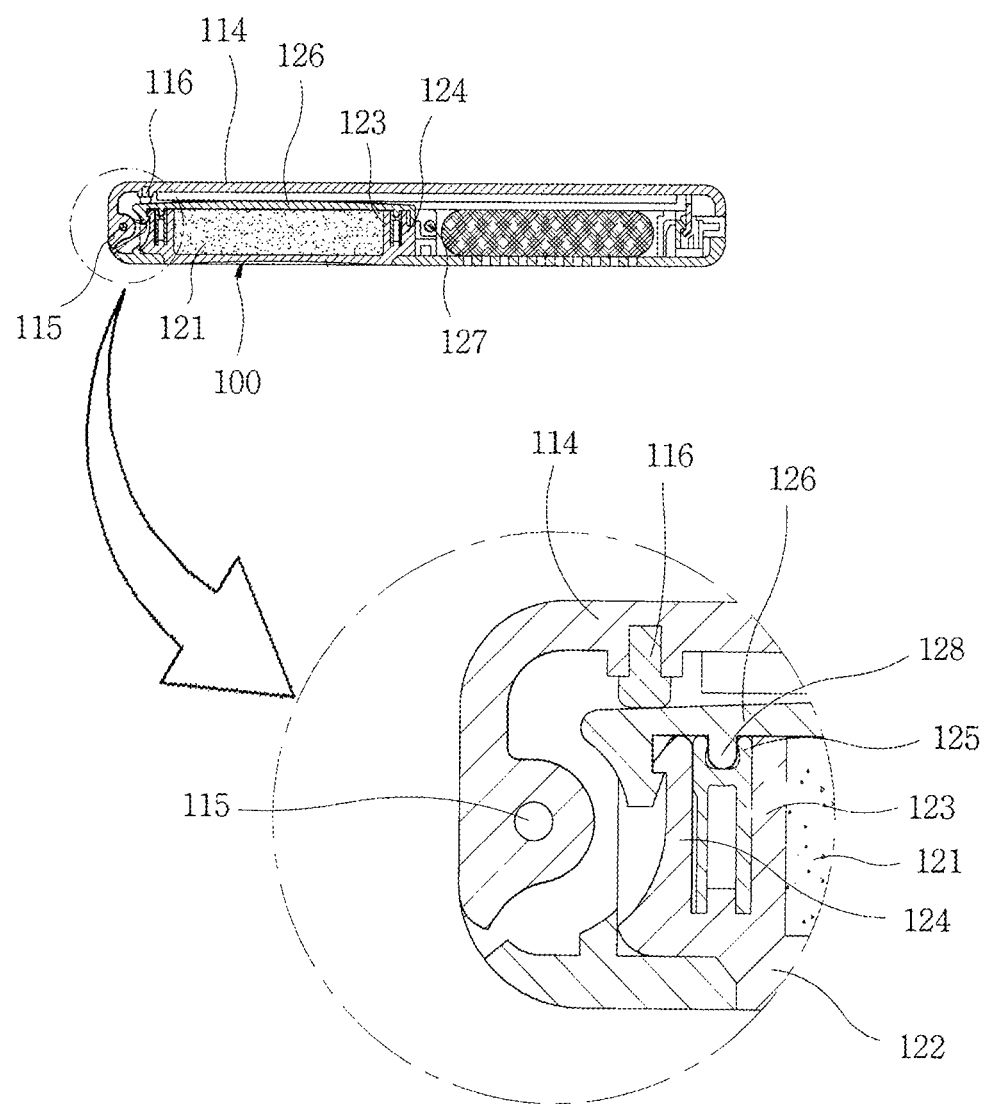
FIG. 2 is a sectional view showing a cosmetic container having a sealing-enhanced airtight lid according to the related art.
Figure 3:
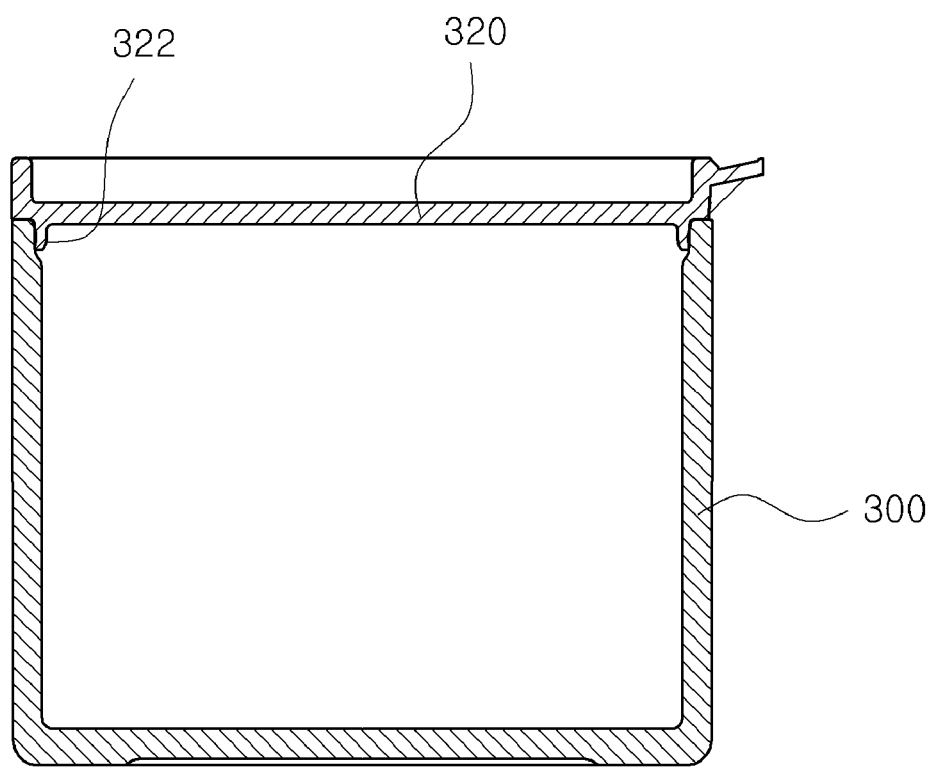
FIG. 3 is a sectional view showing a cosmetic container having an airtight lid provided with a sealing protrusion wheel according to the related art.
Figure 4:
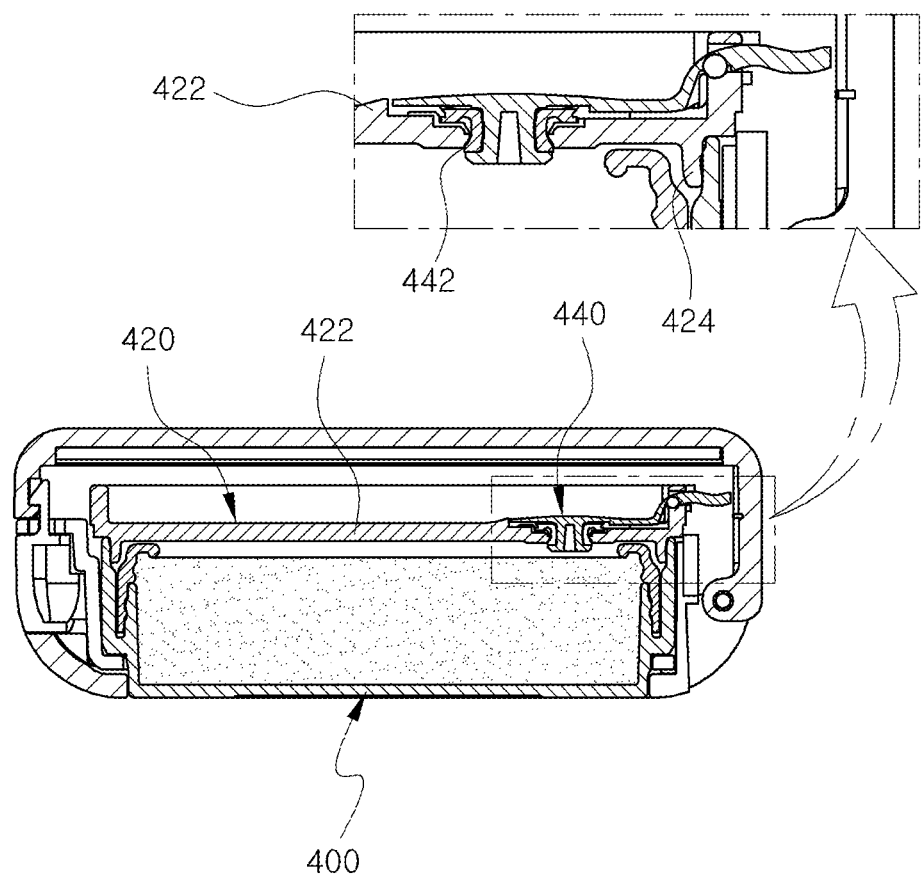
FIG. 4 is a sectional view showing a cosmetic container having an airtight lid provided with an air entrance/exit member according to the related art.
Figure 5:
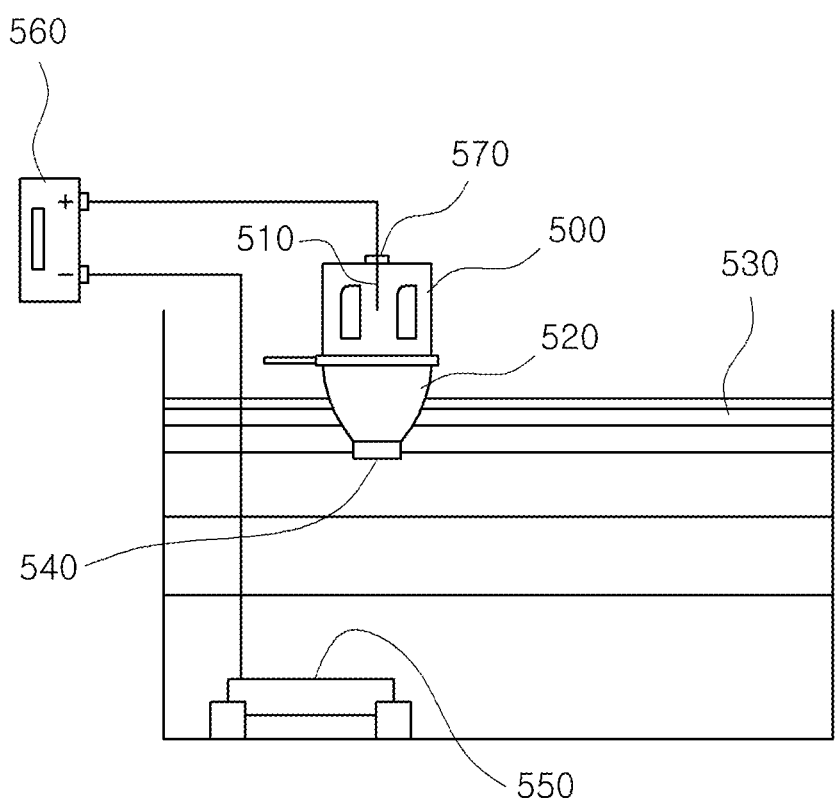
FIG. 5 is a schematic view illustrating sealing preservation of an airtight packaging container according to the related art.
Figure 6:
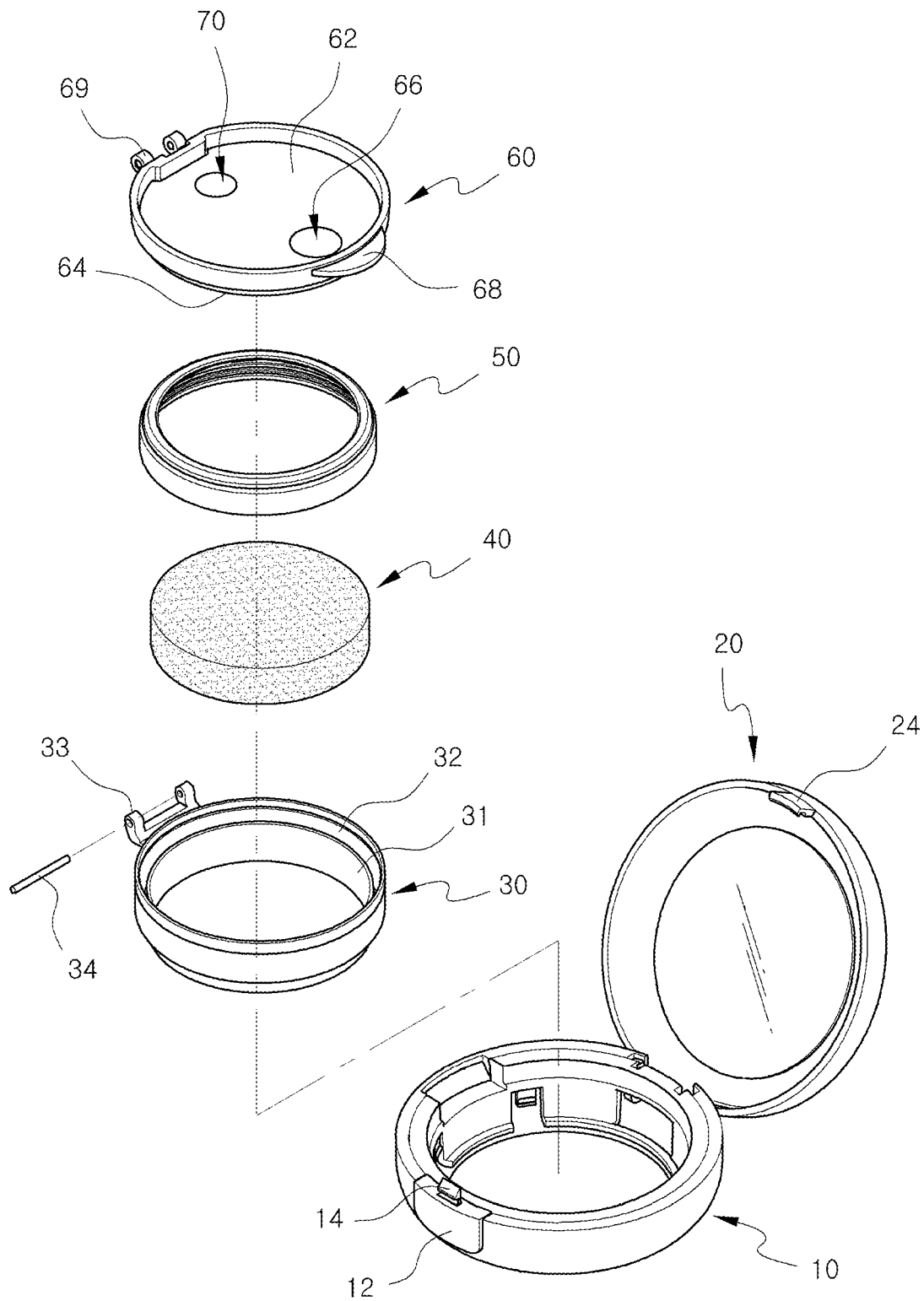
FIG. 6 is an exploded perspective view showing a cosmetic container having a leakage test member according to the present invention.
Figure 7:
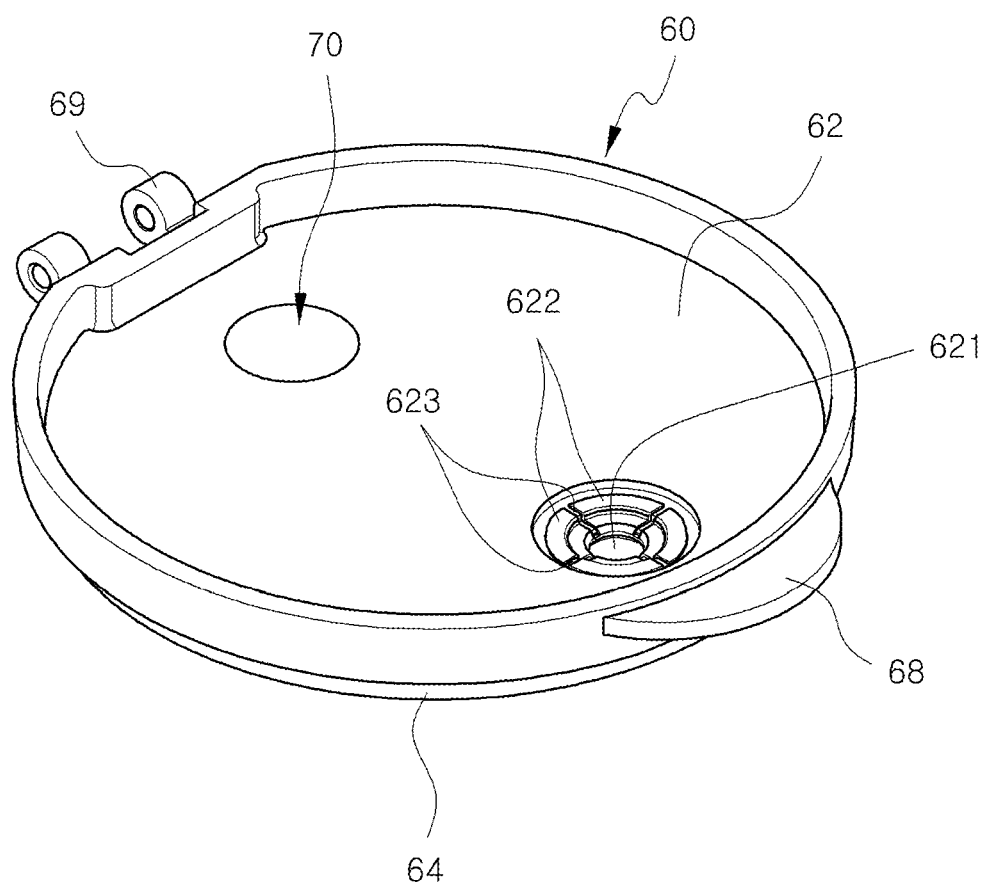
FIG. 7 is a perspective view showing an airtight lid applied to the present invention.
Figure 8:
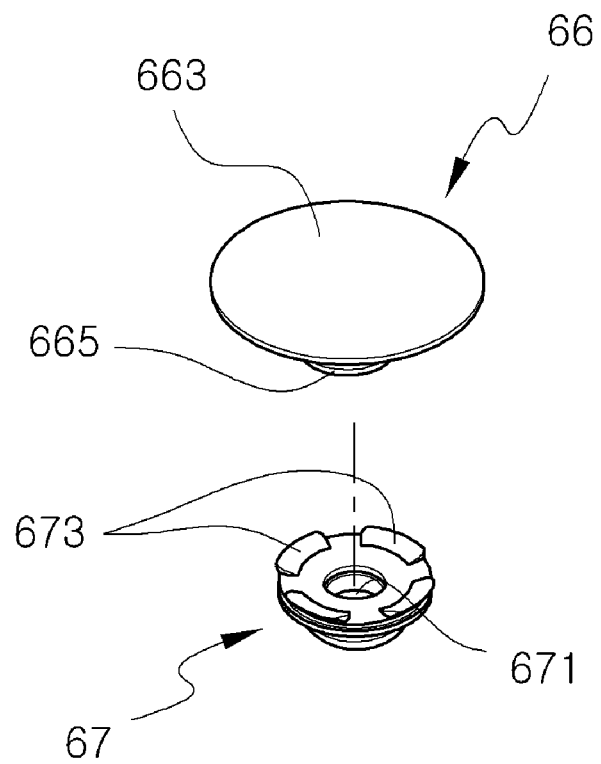
FIG. 8 is a perspective view showing an air entrance/exit member and a packing applied to the present invention.
Figure 9:
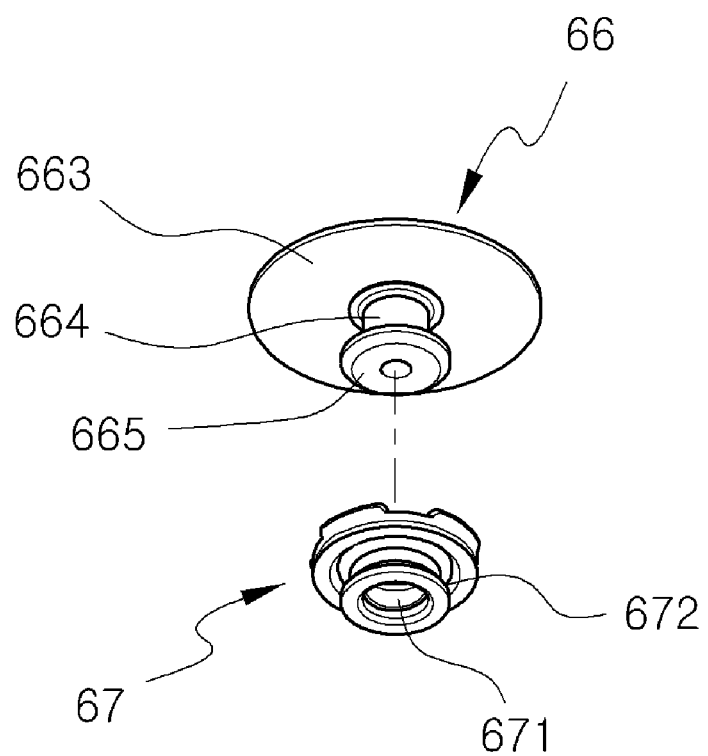
FIG. 9 is a bottom perspective view showing an air entrance/exit member and a packing applied to the present invention.
Figure 10:
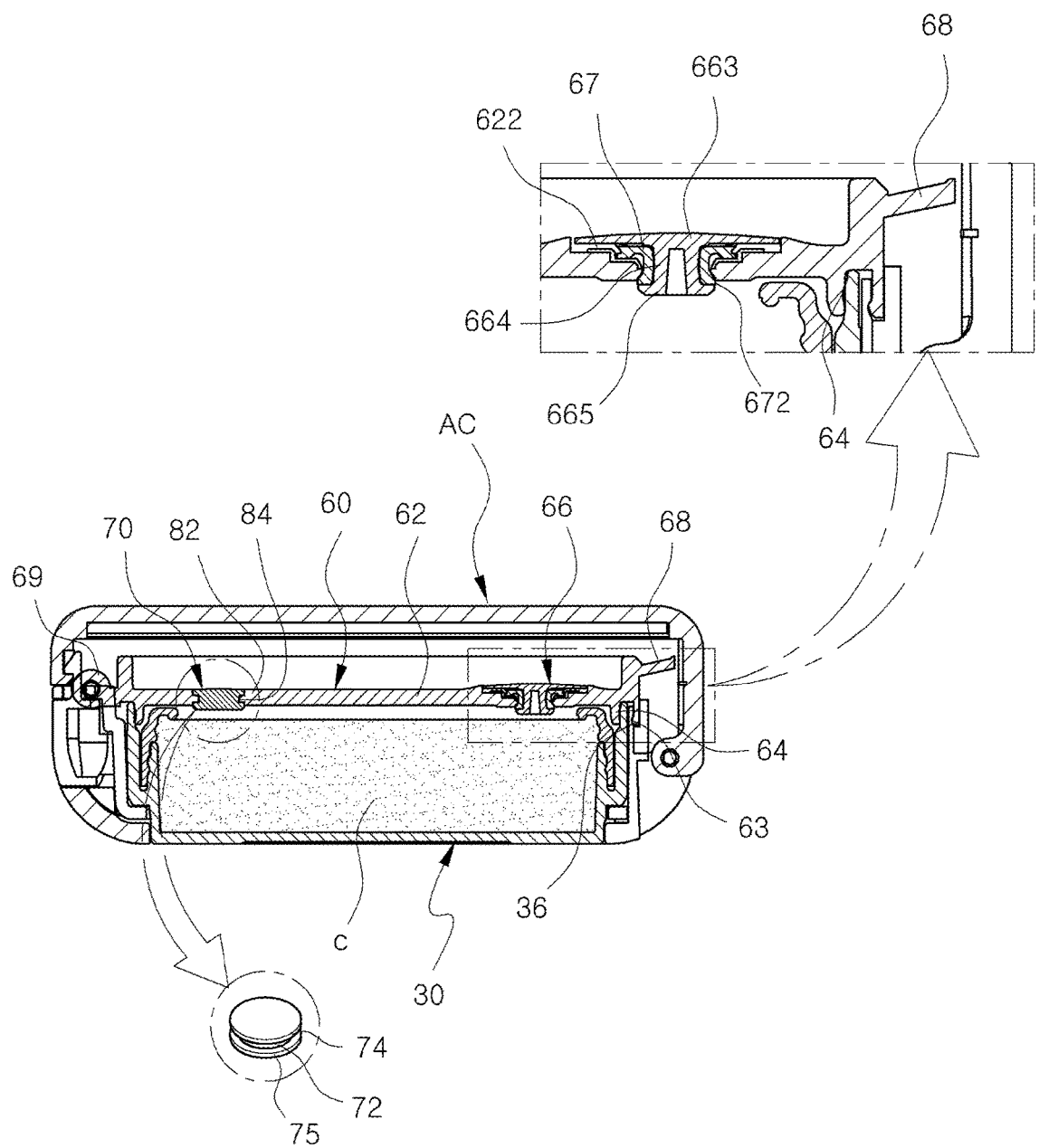
FIG. 10 is a sectional view showing an airtight packaging container capable of easily taking a leakage test according to the present invention.

FIG. 6 is an exploded perspective view showing a cosmetic container having a leakage test member according to the present invention. FIG. 7 is a perspective view showing an airtight lid applied to the present invention. FIG. 8 is a perspective view showing an air entrance/exit member and a packing applied to the present invention. FIG. 9 is a bottom perspective view showing an air entrance/exit member and a packing applied to the present invention. FIG. 10 is a sectional view showing an airtight packaging container capable of easily taking a leakage test according to the present invention.

Hereinafter, an embodiment according to the present invention will be described in detail with reference to accompanying drawings.

In general, according to an airtight packaging container, an outer container cap 20 is hinge coupled to an outer container 10 to be opened or closed and a cosmetic container 30 is coupled to an inside of the outer container 10 such that the cosmetic container 30 is opened or closed by a sealing cap 60.

A button 12 from which a coupling protrusion 14 protrudes is installed onto one side surface of the outer container 10. When a hook 24 is formed on the outer container cap 20 and the outer container cap 20 is hinge coupled to the outer container 10, the hook 24 of the outer container cap 20 is coupled to the coupling protrusion 14 of the button 12, such that the outer container cap 20 may be opened or closed.

When the button 12 is pushed to open the outer container cap 20, the coupling protrusion 14 moves back so that the coupling protrusion 14 is released from the hook 24, so the outer container cap 20 can be opened from the outer container 10.

Although the cosmetic container 30 inserted into the outer container 10 is depicted in the drawings, the embodiment is not limited thereto and the cosmetic container 30 and the outer container 10 are integrally formed with each other. Cosmetics may be directly filled into the cosmetic container 30. Alternatively, after cosmetics are impregnated in an impregnated member 40, the impregnated member 40 may be installed in the outer container 10.

When the impregnated member 40 is installed in the cosmetic container 30, a fixing piece 50 is coupled between inner and outer walls 31 and 32 or the cosmetic container 30 such that the impregnated member (40) may be prevented from being separated from the cosmetic container 30.

The sealing cap 60 is closed by putting the sealing cap 60 on the cosmetic container 30. The sealing cap 60 may be closed without any hinges or may be hinge coupled to the cosmetic container 30 as shown in FIG. 6.

When the sealing cap 60 is coupled to the cosmetic container 30 through a hinge, a first hinge block 33 may be formed on an outer side surface of one side of the cosmetic container 30 and a second hinge block 60, which is coupled to the first hinge blocks 33, other may be formed on an outer side surface of one side of the sealing cap 60.

An airtight packaging container according to the present invention includes a cosmetic container 30; and an airtight lid 60 installed onto the cosmetic container 60 in order to prevent cosmetics c, such as foundation or cosmetic cream, containing a large quantity of volatile ingredients such as water or alcohol, from being evaporated or volatilized, wherein the airtight lid 60 includes a sealing plate 52 for covering the cosmetic container 30; and a sealing protrusion wheel 64 formed on a lower surface of the sealing plate 62 and tightly press-inserted into an inlet of the cosmetic container 30, and a leakage test member 70 formed on the sealing plate 62 of the airtight lid 60.

When the airtight packaging container capable of easily taking a leakage test according to the present invention is given the leakage test, after the leakage test member 70 of the airtight lid 60 is pricked with a syringe needle 93 and air is injected into the cosmetic container 30, the varying of pressure is observed.

Thus, since air must not be leaked through the portion pricked with the syringe needle 93 even though the leakage test member 70 is pricked with the syringe needle 93 and the syringe needle 33 is drawn back from the leakage test member 70, the leakage test member 70 is preferably formed of one of elastomer, silicon rubber and NBR rubber having superior restoration.

The leakage test member 70 may be formed on the airtight lid 60 through a dual injection or an insert injection. Alternatively, after the leakage test member 70 is separately molded, the leakage test member 70 may be assembled with the airtight lid (60). The assembly may be completed through a forcible fitting assembly, by using adhesive or through thermal adhesion.

In the embodiment, the leakage test member 70 and the airtight lid 60 separately molded and assembled through forcible fitting are depicted in the drawings.

The leakage test member 70 may be formed in a cylindrical or polygonal pillar shape. However, when leakage test member 70 may be formed in a polygonal pillar shape, since the edges of the polygonal pillar are weak in air tightness, it is preferable to form the leakage test member 70 in a cylindrical in order to enhance the air tightness with the airtight lid 60.

Figure 12:
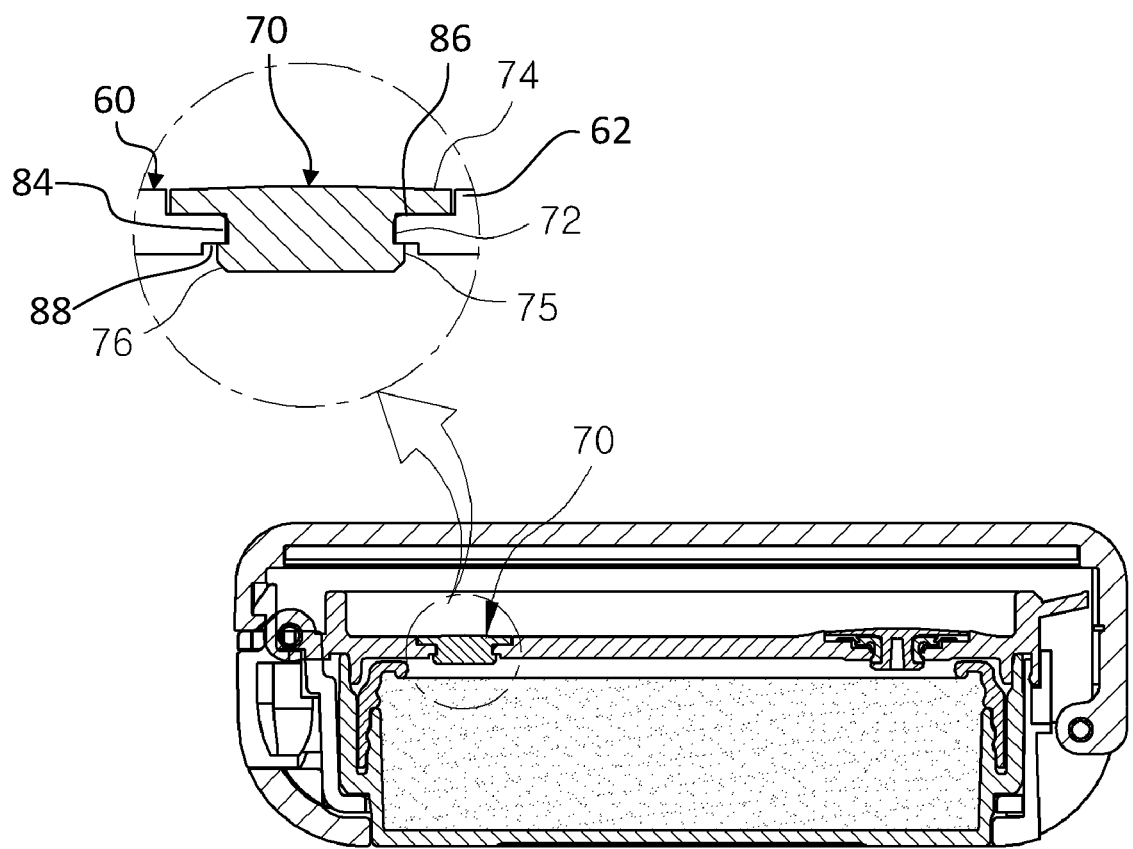
FIG. 12 is a sectional view showing another example of a leakage test member applied to the present invention.

As shown in FIG. 12, the leakage test member 70 is provided at a center thereof with a coupling groove 72. The sealing plate 62 of the airtight lid 60 is provided with a coupling hole 82 into which the leakage test member 70 is coupled. A coupling protrusion wheel 84 is formed at a center of the coupling hole 82. An upper step groove (86) and a lower step groove (88) are formed by the coupling protrusion wheel (84) as shown in FIG. 12. Furthermore, the coupling protrusion wheel 84 of the sealing plate 62 is coupled into the coupling groove of the leakage test member 70, so that the leakage test member 70 is coupled to the sealing plate 62.

The leakage test member 70 includes an upper ring rim 74 positioned over the coupling groove 72 and a lower ring rim 75 below the coupling groove 72.

Although the diameters of the upper and lower rig rims 74 and 75 are equal to each other, it is preferable that the diameter of the upper rig rim 74 is greater than that of the lower ring rim 74 as shown in FIG. 12, wherein the upper ring rim 74 is received in upper step groove 86, also shown in FIG. 12. The reason is because, when the leakage test member 70 is pricked with the syringe needle 93, the leakage test member 70 is pushed by the syringe needle 93, so that the leakage test member 70 may be separated from the coupling hole 82 of the sealing plate 62 to be press inserted into the cosmetic container 30. To prevent the problem, it is preferable to form the upper rig rim 74 to have a larger size than that of the lower ring rim 74.

Preferably, the lower ring rim 75 is provided at a periphery of a lower end thereof with a taper 76 in order to allow the leakage test member 70 to be easily coupled into the coupling hole 82 of the sealing plate 62.

It is preferable that the leakage test member (70) has a thickness in a range of 1.5 mm to 5.0 mm. The reason is because, when the thickness of the leakage test member 70 is less than 1.5 mm and the syringe needle 93 is drawn back after the leakage test member 70 is pricked with the syringe needle 93, the site pricked with the syringe needle 93 may be exposed to air due to weak restoring force. When the thickness of the leakage test member 70 exceeds 5.0 mm, it is difficult to prick-insert the syringe needle 93 into the leakage test member 70 and the syringe needle 93 may be easily broken or bent. Thus, it is preferable to form the leakage test member 70 to have a thickness in a range of 1.5 mm to 5.0 mm.

It is preferable to form the leakage test member 70 to have a diameter in a range of 3.0 mm to 8.0 mm. The reason is because, although the leakage test member 70 is pushed laterally to be pressed due to a thickness of the syringe needle 93 when the leakage test member 70 is pricked with the syringe needle 93, when the diameter of the leakage test member 70 is less than 3.0 mm, the leakage test member 70 has no room to be pushed and pressed laterally, so that the syringe needle 93 does not pass through the leakage test member 70, thereby being bent or broken. In case that, the diameter of the leakage test member 70 exceeds 8 mm, when the leakage test member 70 is pricked with the syringe needle 93 to inject air into the cosmetic container 30, the internal pressure of the cosmetic container is increased, so that the leakage test member 70 may be separated from the coupling hole 82 of the sealing plate 62 while expanding. Therefore, it is preferable to form the leakage test member 70 to have a diameter in the range of 3.0 mm to 8.0 mm.

The airtight lid 60 may be hinge coupled to the cosmetic container 30, and a handle 68 may be diagonally formed on the hinged part of the airtight lid 60. A coupling protrusion 63 is formed below the handle 68 such that the coupling protrusion 63 is coupled into the coupling groove 36 formed in the cosmetic container 30.

Preferably, after the cosmetic container 30 is closed with the airtight lid 60 by coupling the coupling groove 63 of the airtight lid 60 into the coupling groove 36 of the cosmetic container 30, in order to test whether the cosmetic container 30 is fully closed with the airtight lid 60, air is injected into the cosmetic container 30 through the leakage test member 70 while the leakage test member 70 is pricked with the syringe needle 93 until the internal pressure of the cosmetic container (30) is in the range of 1 kgf/cm$^2$ to 5 kgf/cm$^2$. In this case, in order to prevent the airtight lid 60 from being opened by the air pressure in the cosmetic container 30, the coupling protrusion 63 of the airtight lid 60 just be coupled into the coupling groove 36 of the cosmetic container 30 with a predetermined coupling strength. Preferably, the coupling protrusion 63 of the airtight lid 60 is coupled into the coupling groove 36 of the cosmetic container 30 with the predetermined coupling strength, so that, when force in a range of 3 kgf to 5 kgf is applied to the airtight lid 60 against the cosmetic container 30, the airtight lid 60 is opened from the cosmetic container 30.

If the airtight lid 60 is opened at the force less than 3 kgf, when air is introduced into the cosmetic container 30 and the air pressure is increased, the airtight lid 60 is opened, so that it is difficult to perform the leakage test. If the airtight lid 60 is opened at the force exceeding 5 kgf, since most cosmetic customers are women, it is difficult for women to open the airtight lid 60. Thus, preferably, the coupling protrusion 63 of the airtight lid 60 is coupled into the coupling groove 36 of the cosmetic container 30, such that the airtight lid 60 is opened from the cosmetic container 30 when force in the range of 3 kgf to 5 kgf is applied to the airtight lid 60.

In addition, it is preferable to form the air entrance/exit member 66 on the sealing plate 62 of the airtight lid 60 together with the leakage test member 70.

Figure 11:
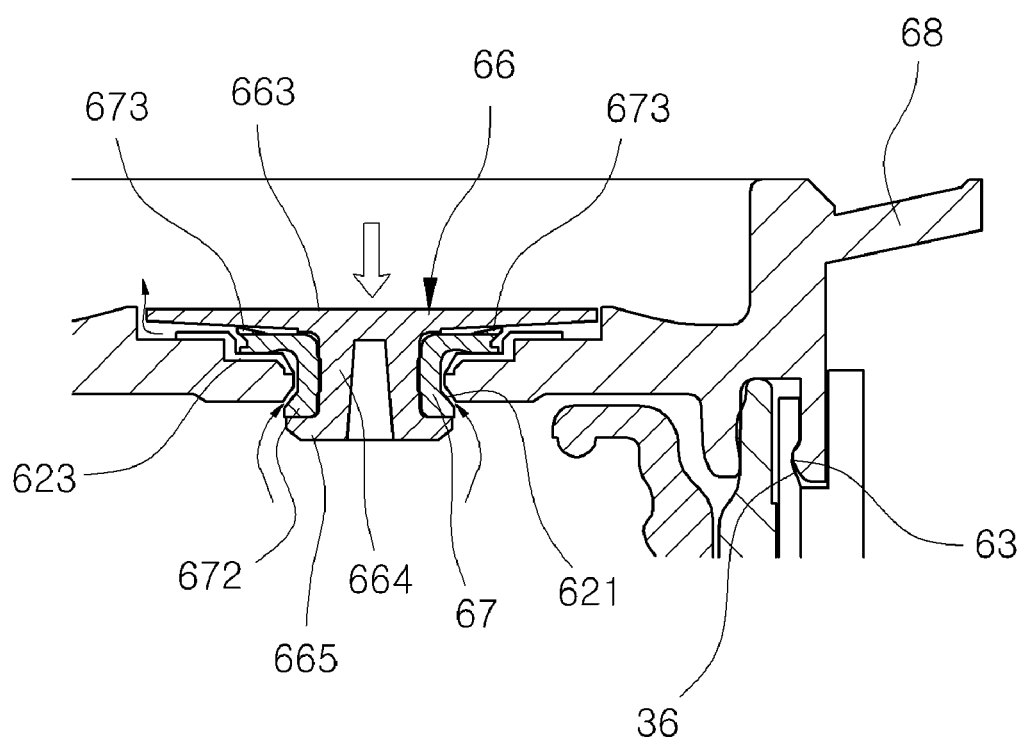
FIG. 11 is a view showing a state that the internal air of a cosmetic container is discharged by pushing a cover plate of an air entrance/exit member applied to the present invention.

FIG. 11 is a view showing a state that the internal air of a cosmetic container is discharged by pushing a cover plate of an air entrance/exit member applied to the present invention.

Since the internal air of the cosmetic container 30 is compressed when the airtight lid 60 is closed while the sealing protrusion wheel 64 formed on the airtight lid 60 is tightly press-inserted into the inlet of the cosmetic container 30, the internal air pressure of the cosmetic container 30 is raised, so that the closed airtight lid 60 bounces upward to be opened again. To prevent it, the problem of compressing air when the cosmetic container 30 is closed with the airtight lid 60 must be solved.

Thus, according to the present invention, the air entrance/exit member 66 is installed to the airtight lid 60 to prevent air from being compressed while the sealing protrusion wheel 64 of the airtight lid 60 is tightly inserted into the inlet of the cosmetic container 30 when the cosmetic container 30 is closed with the airtight lid 60 to seal the cosmetic container 30.

That is, a coupling hole 621, into which the air entrance/exit member 66 is coupled, is formed in the sealing plate 62, and a plurality of ribs 622 is formed near the coupling hole 621, so that slits 623, through which air flows, are formed between the ribs 622. The air entrance/exit member 66 includes a cover plate 663 for covering an upper portion of the coupling hole 621 of the airtight lid 60, a coupling rod 664 integrally formed below the cover plate 663 and inserted into the coupling hole 621 of the airtight lid 60, and a packing-separation preventing protrusion wheel 665 extending from an end of the coupling rod 664 to prevent the packing 67 from being separated therefrom.

In addition, a packing 67 is fitted with the coupling rod 664 of the air entrance/exit member 66 and provided at a center thereof with a rod coupling hole 671 coupled to the coupling rod 664 of the air entrance/exit member 66. An expansion part 672 is formed on a lower portion of the packing 67 to open or close the coupling hole 621 of the airtight lid 60. A resilient part 673 is formed on an upper portion of the packing 67 to elastically and upwardly support the cover plate 663 of the air entrance/exit member 66 to allow the expansion part 672 to close the coupling hole 621 of the airtight lid 60.

Thus, when the cover plate 663 of the air entrance/exit member 66 is pushed downward while the airtight lid 60 covers the cosmetic container 30, the expansion part 672 of the packing 67 is pressed to move down together with the coupling rod 664 while the resilient part 673 formed on an upper surface of the packing 67 is compressed, so that a gap is created between the expansion part 672 of the packing 67 and the coupling hole 621 of the airtight lid 60, so the compressed air generated in the cosmetic container 30 is discharged through the gap so that the cosmetic container 30 is tightly closed with the airtight lid 60.

In order to test whether the cosmetic container 30 is leaked, after the airtight lid 60 tightly covers the cosmetic container 30 and the leakage test member 70 of the airtight lid 60 is pricked with the syringe needle 93 of a test apparatus described below to inject air, the air pressures are compared with each other after a predetermined time is elapsed.

The apparatus for testing a leakage of an airtight packaging container for easy leakage test according to the present invention, which is formed as described above, will be described in detail below.

Figure 13:
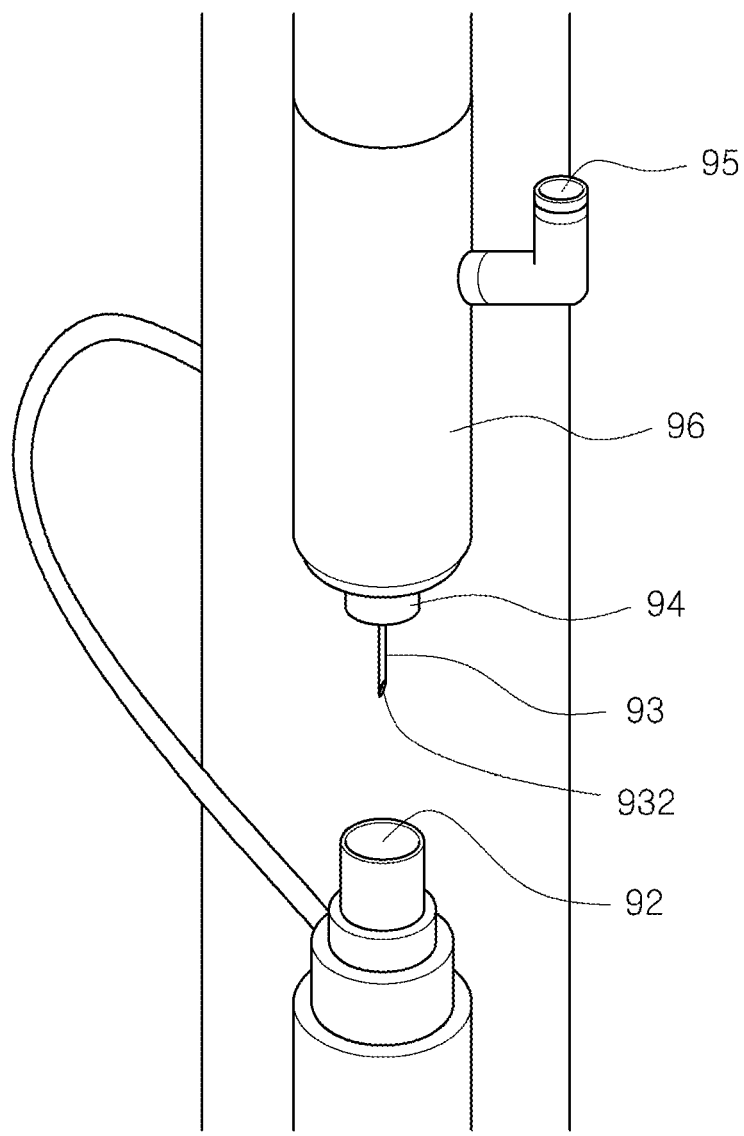
FIG. 13 is a schematic view showing an apparatus for testing a leakage of an airtight packaging container for easy leakage test according to the present invention.

FIG. 13 is a schematic view showing an apparatus for testing a leakage of an airtight packaging container for easy leakage test according to the present invention.

The apparatus for taking a leakage test of whether the airtight packaging container is perfectly sealed according to the present invention includes a product seat member 92 for seating the airtight packaging container AC on which a leakage test member 70 is formed; an air injection member 94 for injecting air through the leakage test member 70, the air injection member 94 having a syringe needle 93 mounted thereon; and an air compressor 96 for sucking air through an air suction inlet 95 and injecting the air into a cosmetic container 30 through the syringe needle 93 of the air injection member 94.

The product seat member 92 for seating the airtight packaging container (AC), in which the leakage test member 70 is formed, includes a fixing member for fixing the airtight packaging container (AC). The leakage test member 70 of the cosmetic container 30 is exposed by opening an outer container cap 20.

In addition, the product seat member 92 includes a moving member for moving the product seat member (92) by sensing a position of the air injection member (94) using a sensor to allow the air injection member (94), to which the syringe needle (93) is installed, to move down such that the syringe needle (93) passes through a center of the leakage test member (70).

The air injection member 94, to which the syringe needle 93 is installed to inject air through the leakage test member 70, moves up or down by a motor. In addition, since the syringe needle 93 is worn or broken with use, the syringe needle 93 is installed to be easily detachable from the air injection member 94.

Although the syringe needle 93 must have a predetermined thickness to have strength sufficient to pass through the leakage test member 70, when the syringe needle 93 is too thick, the air injection member 94 pricked with the syringe needle 93 is not elastically deformed but plastic-deformed into the original state. Thus, preferably, the syringe needle 93 has a diameter in the range of 0.2 can to 1.5 mm and formed of stainless steel.

The air injection member 94 may control a descent or ascent distance by using a sensor or a limit switch (which is an automatic control switch for stopping a power motor by blocking the current supplied to the power motor when passing through a predetermined point).

The air compressor 96 sucks air through the air suction inlet 95 and discharges the air through the syringe needle 93. According to the present invention, when the syringe needle 93 passes through the leakage test member 70 of the cosmetic container 30, the outlet 932 of the syringe needle 93 is placed in the cosmetic container 30, so that the air compressor 96 is operated to inject air.

As air is injected, when the internal pressure of the cosmetic container 30 is in the range of 1 kgf/cm² to 5 kgf/cm², the operation of the air compressor 96 is stopped by the sensor and the air injection member 94 is lifted up so that the syringe needle 93 is withdrawn from the cosmetic container 30.

Thereafter, after the airtight packaging container (AC) is left for a predetermined time, the internal pressure of the cosmetic container 30 is measured to be compared with the internal pressure in injecting air. As the comparison result, when the pressure is lowered, the cosmetic container 30 and the airtight lid 60 entrance/exit member 66 are leaked. If the pressure is not changed, it is determined that there are not any leakages.

Hereinafter, a method of testing a leakage of an airtight packaging container for easy leakage test according to the present invention by using a leakage test apparatus of the present invention will be described in detail.

Figure 14:
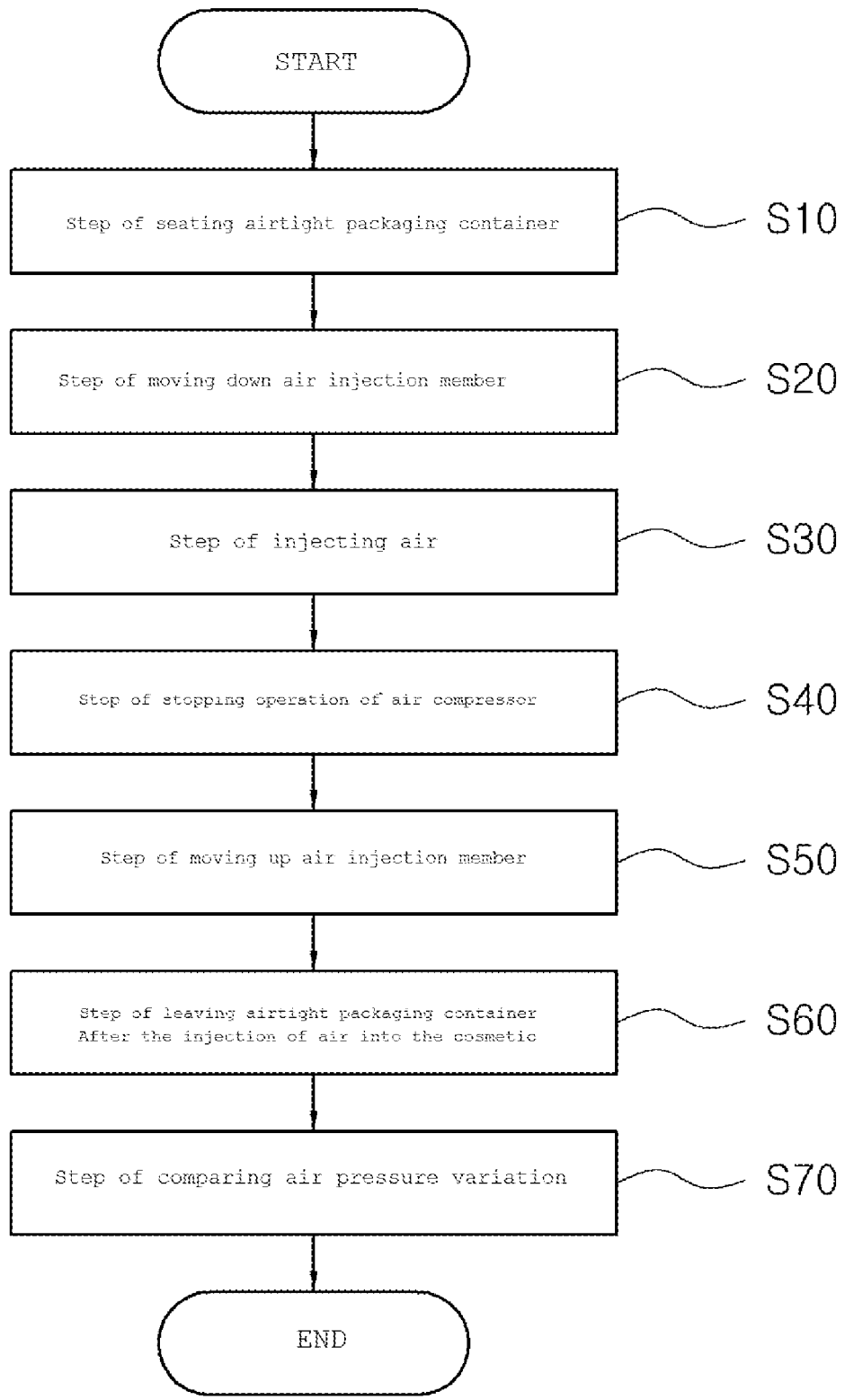
FIG. 14 is a flowchart sequentially illustrating a method of testing a leakage of an airtight packaging container for easy leakage test according to the present invention.

FIG. 14 is a flowchart sequentially illustrating a method of testing a leakage of an airtight packaging container for easy leakage test according to the present invention.

S10: Step of Seating Airtight Packaging Container

According to the method of taking a leakage test of whether an the airtight packaging container is perfectly sealed, the airtight packaging container AC including the leakage test member 70 to be leak-tested is seated at a product seat member 92.

In this case, preferably, the outer container cap 20 is opened to expose the leakage test member 70 of the cosmetic container 30 and the test target airtight packaging container AC is fixed with the fixing member such that packaging container AC is prevented from moving.

In addition, after the position of the leakage test member 70 is confirmed by using the sensor such that the position of the leakage test member 70 is always maintained, the protract seat member 92 is transferred by the motor, such chat the leakage test member 70 is located below the syringe needle 93.

S20: Step of Moving Down Air Injection Member

By moving down the air injection member 94 on which the syringe needle 93 is mounted, the syringe needle 93 is allowed to pass through the leakage test member 70 of the cosmetic container 30, such that the outlet 332 of the syringe needle 93 is placed in the cosmetic container 30.

The air injection member 94 is formed to move up or down by the motor and the moving up or down of the air injection member 94 is controlled by using the sensor or limit switch such that the outlet 932 of the syringe needle 93 is placed at the center of an inside of the cosmetic container 30.

Since the syringe needle 93 is worn or broken with use, the syringe needle 93 is installed to be easily detachable from the air injection member 94.

S30: Step of Injecting Air

Air is sucked through the air suction inlet 95 by operating the air compressor 96 to inject the air into the cosmetic container 30 through the syringe needle 93 mounted on the air injection member 94.

When the syringe needle 93 passes through the leakage test member 70 of the cosmetic container 30, the outlet 932 of the syringe needle 93 is placed in the cosmetic container 30, so that the air compressor 96 is operated to inject air.

When the cosmetics containing a large quantity of water and volatile ingredients are contained in the cosmetic container 30, even though the internal pressure of the cosmetic container 30 is in the range of 1 kgf/cm² to 5 kgf/cm², the air must be leaked in order to prevent the water and volatile ingredients from being evaporated and volatilized.

Thus, when the air is injected into the cosmetic container 30, air is injected until the internal pressure of the cosmetic container 30 is in the range of 1 kgf/cm² to 5 kgf/cm².

S40: Step of Stepping Operation of Air Compressor

After air is injected until the internal pressure of the cosmetic container 30 is in the range of 1 kgf/cm² to 5 kgf/cm², the operation of the air compressor 96 is stopped by sensing the pressure through the sensor.

S50: Step of Moving Up Air Injection Member

When the internal pressure of the cosmetic container 30 reaches a suitable level so that the operation of the air compressor 96 is stopped, the air injection member 94 on which the syringe needle 93 is mounted is lifted up such that the syringe needle 33 is separated from the cosmetic container 30.

S60: Step of Leaving Airtight Packaging Container

After the injection of air into the cosmetic container 30 is completed, the airtight packaging container AC is left for a predetermined time. Generally, the airtight packaging container AC is left for 5 hours to 48 hours, preferably, 10 hours to 24 hours.

S70: Step of Comparing Air Pressure Variation

After the predetermined time is elapsed, she internal pressure of the cosmetic container 30 is measured and compared with the internal pressure under air injection. If the pressure is lowered, it is determined that a leakage occurs between the cosmetic container 30 and the airtight lid 60 or between the sealing plate 62 and the air entrance/exit member 66. If the pressure is not changed, it is determined that there is no leakage.

The airtight packaging container for easy leakage test, and a method and an apparatus for testing a leakage by using the airtight packaging container described in this disclosure are for an illustrative purpose only and the present invention is not limited thereto.

Thus, it should be understood that numerous other modifications and embodiments can be devised by those skilled in the art within the spirit and scope of the present invention and they will fall within the scope of the present invention.

DESCRIPTION OF REFERENCE NUMERAL

10: Outer container
20: Outer container cap
30: Cosmetic container
36: Coupling groove
60: Airtight lid
62: Sealing plate
621: Coupling hole
623: Slit
63: Coupling protrusion
64: Sealing protrusion wheel
66: Air entrance/exit member
663: Cover plate
664: Coupling rod
665: Packing-separation preventing protrusion wheel
67: Packing
671: Rod coupling hole
672: Extension part
673: Resilient part
70: Leakage test member
72: Coupling groove
74: Upper ring rim
75: Lower ring rim
82: Coupling hole
84: Coupling protrusion wheel
92: Product seat member
93: Syringe needle
932: Outlet
94: Air injection member
96: Air compressor
95: Air inlet

The invention claimed is:

1. An airtight packaging container to facilitate testing for a leak, the airtight packaging container comprising:
a cosmetic container (30);
an airtight lid (60) installed onto the cosmetic container (30) in order to prevent cosmetics (c) stored therein, the cosmetics including a volatile ingredient, from being evaporated or volatilized; and
a leakage test member (70) formed on the airtight lid (60),
wherein:
the airtight lid (60) includes:
a sealing plate (62) for covering the cosmetic container (30); and
a sealing protrusion wheel (64) formed on a lower surface of the sealing plate (62) and press-inserted into an inlet of the cosmetic container (30);
the leakage test member (70) has a cylindrical shape and is provided about an outer circumferential side thereof with a coupling groove (72);
the sealing plate (62) of the airtight lid (60) is provided with a coupling hole (82) into which the leakage test member (70) is coupled;
a coupling protrusion wheel (84) is formed circumferentially about and protrudes from an inner wall of the coupling hole (82);
the coupling protrusion wheel (84) of the sealing plate (62) is airtightly coupled into the coupling groove (72) of the leakage test member (70), so that the leakage test member (70) is airtightly coupled to the sealing plate (62); and
the leakage test member (70) includes an upper ring rim (74) positioned over and extending beyond the coupling groove (72); and a lower ring rim (75) positioned below and extending beyond the coupling groove (72), wherein an upper step groove (86) and a lower step groove (88) are formed by the coupling protrusion wheel (84),
wherein a diameter of the upper ring rim (74) is greater than a diameter of the lower ring rim (75),
wherein the upper ring rim (74) is received in the upper step groove (86), and
wherein the upper ring rim (74) is substantially within a same plane as the sealing plate (62).

2. The airtight packaging container of claim 1, wherein the leakage test member (70) is formed of one of elastomer, silicon rubber and NBR rubber, the leakage test member being elastically restorable.

3. The airtight packaging container of claim 1, wherein the lower ring rim (75) is provided at a periphery of a lower end thereof with a taper (76) to facilitate coupling of the leakage test member (70) into the coupling hole (82) of the sealing plate (62).

4. The airtight packaging container of claim 1, wherein the leakage test member (70) has a thickness in a range of 1.5 mm to 5.0 mm.

5. The airtight packaging container of claim 1 wherein the leakage test member (70) has a diameter in a range of 3.0 mm to 8.0 mm.

6. The airtight packaging container of claim 1, wherein the airtight lid (60) is hinge coupled to the cosmetic container (30),
a coupling protrusion (63) diagonally formed on a hinged part of the airtight lid (60) is coupled to a coupling groove (36) formed in the cosmetic container (30),
the cosmetic container (30) is closed with the airtight lid (60) by coupling the coupling protrusion (63) of the airtight lid (60) into the coupling groove (36) of the cosmetic container (30), and
when force in a range of 3 kgf to 5 kgf is applied to the airtight lid (60), the airtight lid (60) is opened from the cosmetic container (30).

* * * * *